Nov. 23, 1943.  F. B. EDWARDS  2,335,000

QUICK DISCONNECT DEVICE

Filed Feb. 17, 1942

FREDERICK B. EDWARDS
*INVENTOR.*

BY

HIS PATENT ATTORNEY

Patented Nov. 23, 1943

2,335,000

UNITED STATES PATENT OFFICE 2,335,000

QUICK DISCONNECT DEVICE

Frederick B. Edwards, Florissant, Mo., assignor to Curtiss-Wright Corporation, a corporation of Delaware Application February 17, 1942, Serial No. 431,217

11 Claims. (Cl. 24—201)

This invention relates to connectors and more particularly to quickly detachable devices for connecting the ends of cables or rods.

In aircraft construction and in many other fields, operating cables or rods are quite extensively used; and in servicing, repairing or replacing such equipment it is frequently necessary that the cables or rods be conveniently detached or disconnected. In aircraft particularly, it is of prime importance that such disconnecting devices be not only readily attachable and detachable but also that they permit of the detachment of rods and cables which are under rigging tension. In aircraft control systems, such as for engine and control surface operation, the cables and rods are initially rigged with appreciable predetermined tension and it is particularly desirable to have a disconnecting fitting which can be opened or closed without the necessity of previously slackening off the cable, or rod, or to subsequently adjust the same to the desired initial tension.

Many previous devices have been proposed and used for these purposes but very few have proven satisfactory under the exacting requirements of aircraft operation and maintenance. Previous devices have been cumbersome and unwieldly and have frequently failed under load due to improper or unsymmetrical design, or lack of safety locking features. Other prior connecting devices have been objected to since they have required the use of tools or other special equipment for their adjustment and use and many have been unnecessarily large and heavy with a tendency toward producing whip or fouling of the cables against the adjacent structure in operation under rough flight conditions.

It is accordingly a principal object of the present invention to provide a readily detachable disconnecting device of a compact type in which the tensile loads are transmitted through the device along a straight axial line. It is also an object to provide such a device which embodies an inherent self-locking feature such that the tension forces to which it is subjected tend to urge it farther into its operating locked position despite the accidental unlocking of its external releasing part. A further object resides in providing such a device which can be opened and closed under tension by a single hand of the operator.

It is a further object of the present invention to provide a disconnecting device in which the take-up distance as measured between the open and closed positions of the device is considerably greater than other prior devices, as is more particularly required in long rigged cable systems to compensate for cable stretching under load. It is also an object to provide such a device for high initially tensioned or rigged cables which may be readily released without slackening of the cable and which permits actual separation of the component parts without the requirement of additional slack in the system. A further object resides in the provision of a particularly efficient leverage system which restores the initially rigged tension in the system upon closure or which draws the cable or rod ends together through the component parts of the device along a true axial line such that all of the loaded parts but one are in tension and all of the pins in the device are in double shear, with all of the loads symmetrically disposed about the axial center line.

Other objects and advantages of the present invention will become apparent during the course of the following description when considered in conjunction with the accompanying drawing, forming a part of this specification and in which like numerals are employed to designate corresponding parts in each of the figures.

Figure 1:
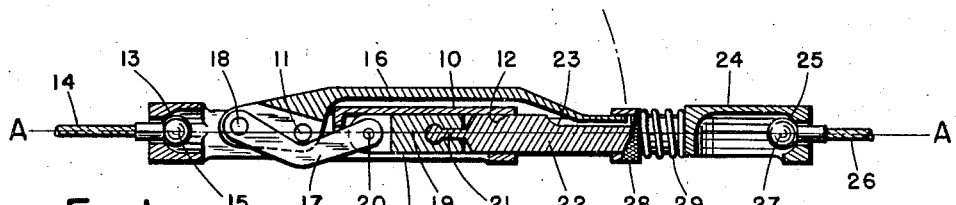
Fig. 1 shows a sectional view of the disconnecting device in its closed position.
Figure 2:
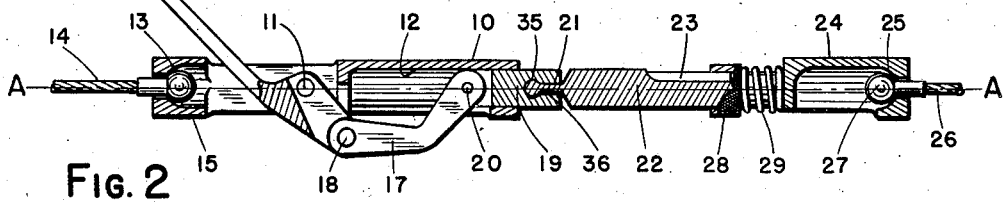
Fig. 2 is a similar sectional view, of the same device shown in Fig. 1, in its opened position.

Referring now to Figs. 1 and 2, it will be seen that the disconnecting device comprises essentially an elongated body 10 which is arranged to provide the fulcrum 11 for a leverage assembly, the body 10 being axially bored or recessed at its inner tubular portion 12. The other terminal 13 of the body 10 is formed to provide a suitable recess for the cable 14 having a ball shank terminal 15. While this type cable terminal has been selected for purposes of explanation, it is pointed out that the present device is readily adapted for any suitable type of commercially available cable terminal such as the swaged, eye end or ball shank types, although the latter is considered to permit of more compact design than most other types of fittings, and has the further additional advantage of forming a universal type connection. An essential feature of any rod or cable terminal, however, is that it should provide a true axial alignment of the rod or cable through the axis of the body 10 along the longitudinal axis A—A indicated in each of the figures.

Figure 3:
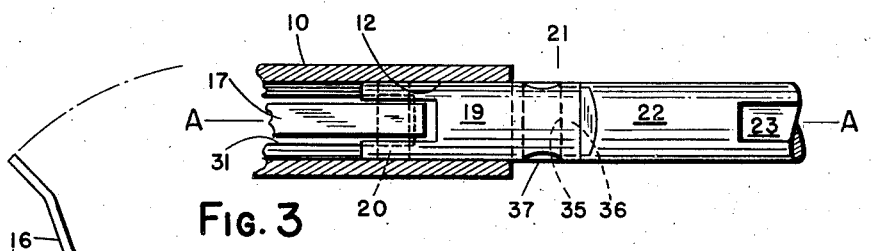
Fig. 3 is a detailed plan view of the separable connector parts of the device shown in the preceding figures.

A lever 16 is pivotally mounted upon the body by means of the pin 11 at the aforementioned fulcrum point, the inner end of the lever engaging a terminal of the obtuse-shaped link 17 through the medium of the pivot pin 18. The opposite terminal of the link 17 is pivotally connected to a cylindrically-shaped plunger element 19 by means of the pivot pin 20. The piston 19 is of an external diameter such that it may be freely guided or reciprocated within the bore 12 of the body 10 upon rotation of the lever 16 and its associated offset link 17. As more clearly shown in the detailed plan view of Fig. 3, the piston 19 is provided with bifurcated portions at each of its ends, the bifurcations of the end adjacent the link 17 arranged vertically in the plane of the path of the lever 16 and the bifurcations at the opposite terminal being preferably arranged perpendicular thereto to provide for the joint connection 21.

A cylindrically shaped connector 22 also of an external diameter to permit its being reciprocated within the bore 12 of the body 10 is provided at one terminal with a mating part to the joint connection 21 and at its other terminal with an enlarged shouldered portion 24 formed with a cable terminal recess 25 to accommodate the cable 26, also having a ball shank terminal 27. Intermediate the terminals of the connector 22 it is provided with a recessed portion 23 into which the free extremity of the aforementioned lever 16 is received. The lever 16 is preferably formed with an intermediate portion which lies parallel and closely adjacent to the main body portion 10 of the device and is preferably formed with offset radially extending end portions to accommodate the pivot pins 11 and 18 at its one extremity and to be received within the recess 23 in the connector 22 at the other. A knurled ferrule or collar 28 internally bored to permit free sliding movement along the cylindrical surface of the connector 22 is provided along the shank portion of the latter and has a compression spring 29 disposed between it and the shoulder of the enlarged portion 24.

By reference to Figs. 1 and 2 it will be seen that the operation of the device in being opened from the position shown in Fig. 1 is as follows: The ferrule 28 is moved outwardly toward the cable 26 compressing the spring 29 to a point where the ferrule is clear of the outer extremity of the lever 16. The latter is then rotated upwardly in a counter-clockwise direction about the axis of the fulcrum 11, at the same time imparting a downward and forward rotation to the link 17 as a result of the counter-clockwise rotation of the pivot pin 18 about the rotational axis of the fulcrum 11. As the lever 16 reaches its extreme open position indicated in Fig. 2, the link 17 has attained its extreme forward position and has pushed the piston 19 through its pivotal connection 20 to a position where it extends beyond the end of the recessed portion of the body 10 exposing the joint connection 21. It should be noted that the piston 19 has been moved outwardly an appreciable distance as determined by the throw of the inner portion of the lever 16 between the fulcrum 11 and the pivot pin 18. This relatively large throw is approximately twice as great as that of other available connectors which are presently in use and has the advantage that in again being closed the device can restore the same initial rigging tension in particularly long cable systems in which the cables are susceptible of considerable elongation or stretch.

When the device is opened to the position shown in Fig. 2, the joint connection 21, which has been exposed beyond the end of the body 10, can be readily separated by opposite movement of the piston 19 and the connector 22 in a transverse direction with respect to the axis A—A. The construction details of the connection 21 are more fully shown in the enlarged view in Fig. 3. From this figure it will be seen that the bifurcated portion of the piston 19 is provided with a transverse cylindrical bore 35 having a diameter approximately twice that of the gap between the bifurcations. The mating portion of the connector 22 is provided with a tongue portion 36 on the extremity of which there is a cylindrical knob 37 of a diameter to freely slide transversely within the cylindrical bore 35. It should also be noted that the connection 21 is adapted to withstand considerable tension in an axial direction when its component parts together with the piston 19 and the adjacent portion of the connector 22 are retracted and housed within the bore 12 of the body 10 which prevents separation of the bifurcated end of the piston. The disconnecting device as shown in Figs. 1 and 2 has been readily opened and closed with one hand of the operator without the necessity of the use of tools of any type and such opening and closing operations with the one hand are easily accomplished by removing and replacing rigging loads of more than fifty pounds in the cables 14 and 26.

In order to close the disconnecting device it is merely necessary to re-insert the tongue of the connection 21 into the recessed piston and rotate the lever 16 in a clockwise direction about the fulcrum 11. When the lever is rotated to its extreme closed position, and its extremity is disposed within the recess 23, the ferrule 28 is permitted to return under action of the spring 29 and to retain the lever in its closed position. It should be noted in this connection, however, that in being closed the tension exerted between the cables 14 and 26 is maintained strictly along the axial center line A—A and the loading of each of the parts of the device is accomplished in a strictly symmetrical and balanced manner which prevents accidental and undesired opening of the device. It should also be noted that when the lever 16 is returned to its closed position the center of the pivot 18 is rotated beyond the dead center position in which it would align with the axes of the pins 11 and 20 along the axis A—A such that the rigging tension in the cables 14 and 26 or any additional tension to which they may be subjected tends to continue the clockwise rotation of the lever 16 by drawing the pivot 18 beyond the pivot 20 above the axis of the pivot 11. This provides an inherent safety locking feature which serves to prevent accidental opening of the device regardless of whether or not the ferrule 28 is in its latching position.

Figure 4:
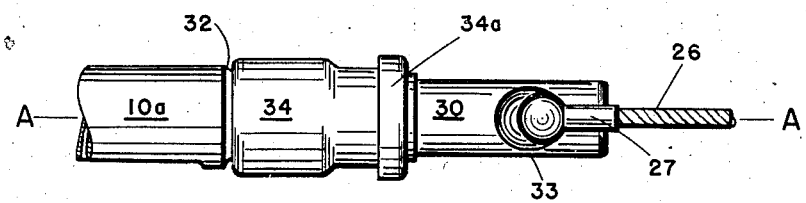
Fig. 4 is an enlarged fragmentary view of the separable connector portion of a simplified modification of the present invention in which two of the elements have been combined into one, shown in its opened position.
Figure 5:
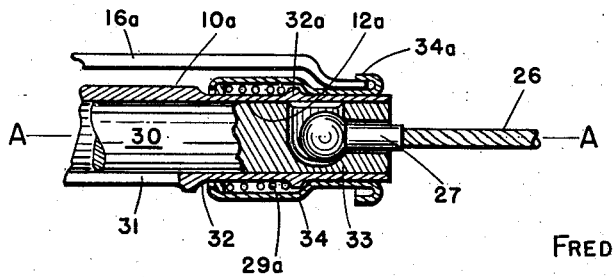
Fig. 5 is a detailed cross-sectional view of the parts shown in Fig. 4 in their closed position.

In Figs. 4 and 5 there is shown a simplified modification of the disconnect portion of the device which is readily substituted for the piston and connector 22 of the form of the device shown in Figs. 1 and 2. In this simpler modification which provides a considerably shorter fitting, the connection 21 of the previously described device is eliminated and the combined piston-connector 30 reciprocable within the bore 12a of the body 10a is recessed at 33 to accommodate the ball shank terminal 27 of the cable 26. The lever 16a is of a shorter length such that its extremity falls closely adjacent the extremity of the body 10a in its closed position. The body 10a is provided with a circumferential recessed portion 32 having a shoulder 32a within which is disposed a coiled compression spring 29a. Arranged to slide freely over the recessed and reduced end portion of the body 10a is a ferrule 34 having substantially an S-shaped cross section. The outer lipped portion 34a of the ferrule is adapted to serve as a detent for the outer extremity of the lever 16a when in its closed position. In order to release the lever for disconnection of the cables, it is merely necessary to move the ferrule 34 outwardly or to the right in Fig. 5, compressing the coil spring 29a between the inwardly bent inner terminal of the ferrule and the shoulder 32a of the body. The latter is additionally provided with a radially extending recess 31 through its lower portion to provide for axial movement of the link 17. The remainder of the modified device shown in Figs. 4 and 5 is substantially identical with that shown in Figs. 1 and 2 with the exception of the size of certain of the parts which may be modified to provide a desired throw of the lever 16.

In the course of the above description of the present invention the elements 14 and 26 have been referred to as cables but it is specifically pointed out that this invention is equally applicable for use with rods, wires of the Bowden or other types, cords, ropes, belts or other force transmitting means, either flexible or rigid, and where they have been designated as "cables" in the foregoing description and in the claims appended hereto, the use of this word is intended to cover all of these mechanical equivalents.

For use in connection with aircraft in installations where weight and size are an important factor, it might be preferable to use the form of the invention shown fragmentarily in Figs. 4 and 5, this modification having an overall length of slightly more than half of that shown in Fig. 1 and being proportionately lighter in weight. The lever, however, will also be proportionately shorter and the leverage available for re-tensioning the cables will be somewhat reduced. This latter modification, however, is very compact and of approximately the same size as the average turnbuckle which would be used for tensioning these cables, particularly when used with the ball shank fittings which provide a minimum overall length and permit the cables to be removed and replaced without damage to the disconnect device. All of the above desirable features are, however, obtained by each of the modifications shown and since the take-up is directly along the axial center line of the disconnect unit and the cable, the arrangement avoids side loads and there is no tendency for the parts to buckle or slide out of position.

Another major advantage of the above described devices is the fact that even were the safety catch ferrule 28 or 34 not used, the center-passing linkage or the relationship of the pivot 18 beyond the dead center line passing through the pivots 11 and 20 along the axis A—A prevents the accidental opening of the device under load due to the toggle locking effect.

Other advantages and uses of the present invention, both with respect to general arrangement and detailed modifications which may become apparent to one versed in the art after a reading of the present description and the attached drawing are each intended to be included within the scope and spirit of this invention as more specifically defined by the appended claims.

I claim:

1. A device for quickly connecting two axially aligned elements comprising a body member having a guide portion, a lever pivoted for rotation with respect to said body member, link means pivotally connected to said lever, a movable member pivotally associated with said link for axial sliding movement with respect to the guide portion of said body member, and means for attaching said elements to the remotely disposed portions of said body and said movable members whereby rotation of said lever draws said element attaching means toward each other.

2. A quickly detachable connecting device comprising an elongated body member having a longitudinal recess and a cable attachment portion, a lever pivotally mounted upon said body member, link means pivotally mounted upon said lever, a movable member slidable within said body recess and pivotally attached to said link means, said movable member having a cable attachment portion associated therewith and means to prevent separation of said movable member and its associated cable attachment portion when said movable member is retracted within said body member by movement of said lever.

3. In a cable connector device comprising at least two cable attached members, the first of said members having an axial bore adapted to slidably receive an intermediate movable member separably attached to said second member, means to prevent separation of said intermediate movable member and said second member when said intermediate movable member is retracted within the axial bore of said first member, and a lever assembly pivotally mounted upon said first member and having a pivotal connection to said movable member, said lever assembly being operable to retract said intermediate movable member within the bore of said first member and to draw said cable attachment members toward each other.

4. A readily disconnectible device for aligned cables comprising a bored body member having a cable attachment terminal, a lever fulcrumed upon said body member, a plunger member reciprocable within said bored body member, a link pivotally interconnecting said lever with said plunger member, a connector member adapted to be separably engaged by said plunger member and reciprocally received within the bored portion of said body member, said connector member having said separable connection at one terminal and a cable attachment at the other terminal, rotation of said lever retracting said plunger and connector members within said bored body portion to draw said cable attachment terminals toward each other, and means to prevent separation of said plunger and connector members upon retraction within said body portions.

5. A readily disconnectible device for aligned cables comprising a body having a bored portion and a cable attachment terminal, a lever fulcrumed upon said body, a sliding element reciprocable within said bored body portion, an offset link pivotally interconnecting said lever with said sliding element, a connector element also adapted to be reciprocally received within the bored portion of said body, said connector element having a separable connection at one terminal engageable with said sliding element and a cable attachment at the other terminal, rotation of said lever retracting said sliding and connector elements within said bored body portion to draw said cable attachment terminals toward each other, means to prevent separation of said sliding and connector members upon retraction within said bored body portion, and spring urged means slidably engaging said connector element adapted to retain said lever in said retracted position.

6. A quickly detachable connecting device for connecting two aligned cables comprising an elongated body member having a longitudinal recess and a cable attachment portion, a lever pivotally mounted upon said body member, link means pivotally mounted upon said lever, a movable member slidable within said body recess and pivotally attached to said link means, said movable member having a cable attachment portion associated therewith whereby retracted movement of said lever and associated link means tensions said cables and retracts said movable member to a locked position within said body recess and a spring-urged element co-axially movable about said movable member adapted to engage the free extremity of said lever and lock the same to both said members in the tensioned condition of said cables.

7. In a quick detachable connector device for cables and the like, including a bored body member adapted to house at least two separable members in locked relationship, the said body member and one of said separable members each having remotely disposed cable attachment terminals, a toggle lever assembly pivotally mounted upon said body member on the axial line defined by said cables, retracted rotation of said lever imparting axial movement of said separable members within said bore along said axial line and axially movable means carried by said device to retain said lever in its locked and retracted position in which said elements are inseparably housed within said body bore and in a tensioned state of said cables.

8. A readily disconnectible device for connecting and tensioning aligned cables comprising a body member having an axially aligned tubular recess at one of its terminals and a cable attachment at its other terminal, said body member also having a diametrically disposed recessed portion intermediate its terminals, a lever pivotally mounted for rocking movement within said central recessed body portion, an offset link pivotally connected to an inner end of said lever and having its other end extending toward said tubular recess, said link being formed such that its ends extend around said lever pivot axis by more than a half circle in the extreme closed position of said lever, a movable member slidable within said tubular recess, said slidable member having a terminal pivotally connected to the second said end of said link, the opposed terminal of said slidable element having a recess adapted to receive a mating connection in a separable relationship, a connector element having at one terminal a separable connector adapted to engage the complementary recess in said slidable member and having a cable attachment at its opposed enlarged terminal portion, a spring-pressed detent element movably supported upon said connector member, said detent element adapted to releasably retain the said lever in its locked position, said device being arranged such that the axes of the connected cables extend centrally through the aligned axes of each of said members and said separable elements, and the pivot axes connecting said lever to said body, and said link to said slidable element, the axis of the pivot connecting said lever to said link being disposed beyond the central axis of the device in the closed position such that tension applied to said cables tends to further close and lock said device, the last said pivotal connection being extended a greater distance to the other side of said central axis on rocking said lever to its open position whereby the separable connection between said slidable and connector elements is projected beyond the tubular recess in said body.

9. In a connector device for cables or the like, a first member having a recessed portion and having a cable attachment portion operatively connected thereto, a slidable member having a separable cable attachment portion operatively connected thereto and being reciprocable within said recessed portion between extended and retracted positions to vary the distance between said cable attachment portions, said slidable member and associated cable attachment portion being inseparable upon retraction within said recess, and means secured to said members operable to extend and retract said slidable member.

10. In a connector device for cables or the like, a first member having a cable attachment portion operatively connected thereto, a second member having a separable cable attachment portion operatively connected thereto, said members being relatively extendible and retractable to vary the distance between said cable attachment portions, said second member and its associated cable attachment portion being inseparable upon relative retraction of said members, and means secured to said members operable to effect relative extension and retraction of said members.

11. In a connector device for cables or the like, a first member having a cable attachment portion operatively connected thereto, a second member having a separable cable attachment portion operatively connected thereto, said members being relatively extendible and retractable to vary the distance between said cable attachment portions, said second member and its associated cable attachment portion being inseparable upon relative retraction of said members, and a lever assembly pivotally secured to said members operable to extend or retract said members to respectively slacken or tension said cables or the like, said tension being effective to releasably retain said lever assembly in its retracted position.

FREDERICK B. EDWARDS.